(12) United States Patent
Baldwin et al.

(10) Patent No.: US 12,240,542 B2
(45) Date of Patent: Mar. 4, 2025

(54) SLIDER FOR SUPPORTING A TRACK

(71) Applicant: Caterpillar Inc., Peoria, IL (US)

(72) Inventors: Alex Daniel Baldwin, Germantown Hills, IL (US); Mircea Dumitru, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 824 days.

(21) Appl. No.: 17/248,587

(22) Filed: Jan. 29, 2021

(65) Prior Publication Data

US 2022/0242502 A1   Aug. 4, 2022

(51) Int. Cl.
*B62D 55/084* (2006.01)
*B62D 55/10* (2006.01)

(52) U.S. Cl.
CPC ......... *B62D 55/0847* (2013.01); *B62D 55/10* (2013.01)

(58) Field of Classification Search
CPC .... B62D 55/10; B62D 55/0847; B62D 55/07; B62D 55/084
USPC .......................... 305/127, 121, 122, 120, 139
See application file for complete search history.

(56) References Cited

U.S. PATENT DOCUMENTS

| | | | |
|---|---|---|---|
| 4,262,973 A * | 4/1981 | Grilli | B62D 55/213 403/294 |
| 7,134,701 B1 | 11/2006 | Ronning | |
| 9,988,110 B2 | 6/2018 | Scheuerman et al. | |
| 10,543,876 B2 * | 1/2020 | Dumitru | B62D 55/0845 |
| 2002/0070606 A1 | 6/2002 | Poetter | |
| 2015/0130268 A1 | 5/2015 | Scheuerman et al. | |
| 2018/0065691 A1 * | 3/2018 | Dumitru | B62D 55/0847 |
| 2018/0170463 A1 * | 6/2018 | Dumitru | B62D 55/10 |

FOREIGN PATENT DOCUMENTS

CN        110525527 A    12/2019

OTHER PUBLICATIONS

Guide Rail Assembly. Komatsu, Komatsu Mining Corp. Group, 2018, 2 pages.

* cited by examiner

*Primary Examiner* — S. Joseph Morano
*Assistant Examiner* — Eva L Comino (57) ABSTRACT

A slider includes a first segment and a second segment. The first segment includes a first upper surface, a first lower surface, and a first interior surface that connects the first upper surface to the first lower surface. The first upper surface is configured to support a track. The first interior surface includes a first component of an attachment mechanism. The second segment includes a second upper surface, a second lower surface, and a second interior surface that connects the second upper surface to the second lower surface. The second upper surface is configured to support the track. The second interior surface includes a second component of the attachment mechanism that is configured to be removably attached to the first component.

20 Claims, 6 Drawing Sheets

SLIDER FOR SUPPORTING A TRACK

TECHNICAL FIELD

The present disclosure relates generally to a an arrangement of slider assemblies of an undercarriage and, for example, to a slider for supporting a track of the undercarriage.

BACKGROUND

In industries such as construction, mining, and forestry, a machine may utilize a track to distribute the weight of the machine on a ground surface. As a result, the machine may be configured to traverse the ground surface with less likelihood of becoming stuck compared to wheel-driven machines. In such a machine, an undercarriage may include a sprocket at one end, an idler at an opposing end, and a slider arrangement mounted therebetween to support and guide the track. In some cases, the slider arrangement may have been designed in a piecemeal—rather than cohesive—manner to address discrete concerns that arose over time. Thus, the slider arrangement may include a plurality of sliders having different designs and different service lives. As a result, the slider arrangement may have significant inventory costs and require relatively complicated and frequent replacement of the sliders, which increases machine downtime.

U.S. Pat. No. 10,543,876 discloses a track support rail for slidably supporting a track assembly of a machine. The track support rail includes a body having a first body end, a second body end, a crown portion, and an upper support surface. The body extends along a longitudinal axis between the first and second body ends. The crown portion is disposed between the first and second body ends along the longitudinal axis. The upper support surface extends along the longitudinal axis between the first and second body ends. The upper support surface includes first and second curved segments. The first curved segment has a first curved shape and extends from the first body end towards the crown portion of the body. The second curved segment has a second curved shape and extends from the second body end toward the crown portion of the body. The first curved shape is different from the second curved shape.

The slider of the present disclosure solves one or more of the problems set forth above and/or other problems in the art.

SUMMARY

In some implementations, a split slider includes a first segment having a first upper surface, a first lower surface, and a first interior surface that connects the first upper surface to the first lower surface, wherein the first upper surface is configured to support a track, and the first interior surface includes a first component of an attachment mechanism; and a second segment having a second upper surface, a second lower surface, and a second interior surface that connects the second upper surface to the second lower surface, wherein the second upper surface is configured to support the track, and the second interior surface includes a second component of the attachment mechanism that is configured to be removably attached to the first component of the attachment mechanism.

In some implementations, an end slider assembly includes an end support member that is configured to be attached to an undercarriage frame at a location that is adjacent to a sprocket or an idler; and an end slider that is configured to support a track, wherein the end slider includes: a height that is greater than a height of the end support member, a width that is greater than a width of the end support member, and a length that is greater than a length of the end support member, and the end slider, along the length thereof, has a first radius of curvature and a second radius of curvature that is greater than the first radius of curvature.

In some implementations, a slider arrangement includes at least one end slider having a first end segment and a second end segment that is removably attached to the first end segment, wherein the first end segment and the second end segment together form an upper surface of the at least one end slider that is configured to support a track, wherein, along a longitudinal direction of the slider arrangement, the upper surface of the at least one end slider includes a first radius of curvature and a second radius of curvature that is greater than the first radius of curvature; and at least one central slider having a first central segment and a second central segment that is removably attached to the first central segment, wherein the first central segment and the second central segment together form an upper surface of the at least one central slider that is configured to support the track, wherein the upper surface of the at least one central slider is substantially linear along the longitudinal direction of the slider arrangement.

DETAILED DESCRIPTION

This disclosure relates to a slider for supporting a track, which is applicable to a machine having a track-type undercarriage. For example, the machine may be a rope shovel, a hydraulic mining shovel, an excavator, a forest machine, or another type of machine.

To simplify the explanation below, the same reference numbers may be used to denote like features. The drawings may not be to scale.

Figure 1:
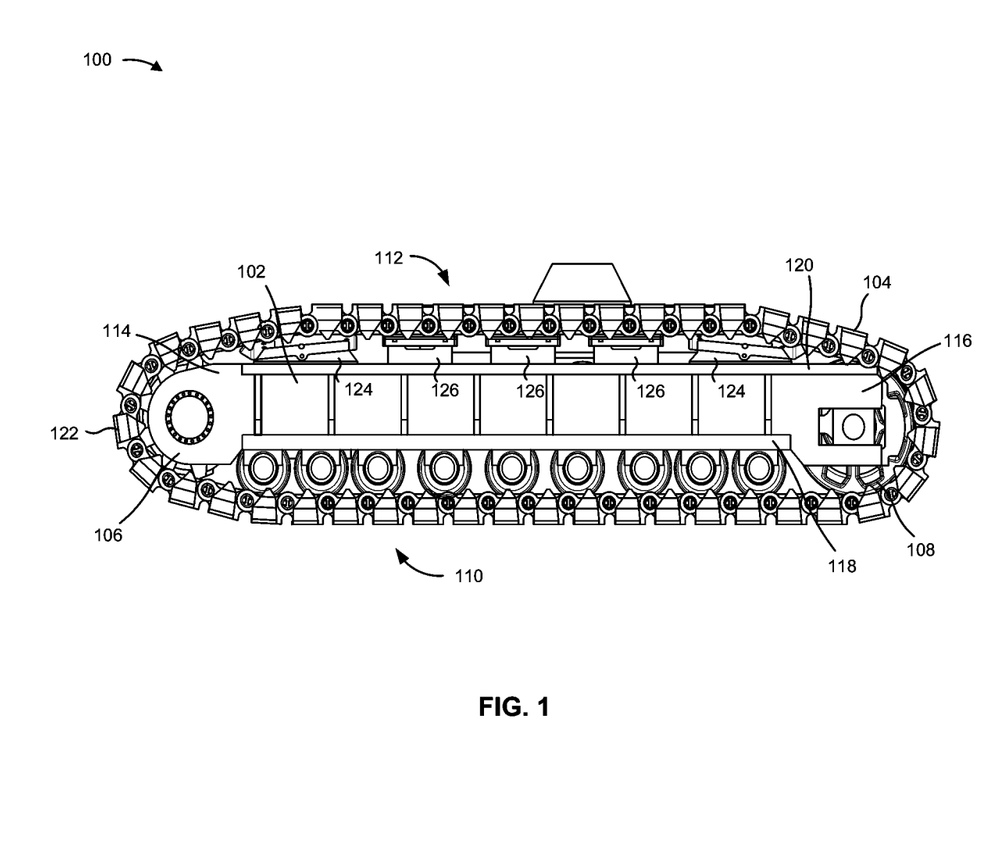
FIG. 1 is a side view of an exemplary undercarriage including a track.

FIG. 1 depicts an exemplary undercarriage 100. As indicated above, the undercarriage 100 is configured to support a machine (not shown), such as a rope shovel, a hydraulic mining shovel, an excavator, a forest machine, or another type of machine. The undercarriage 100 includes a frame 102, a track 104, a sprocket 106, an idler 108, a plurality of rollers 110, and an arrangement of slider assemblies 112. The frame 102 is a structure that supports the track 104, the sprocket 106, the idler 108, the plurality of rollers 110, and the arrangement of slider assemblies 112. The frame 102 includes a rear end 114, a front end 116, a lower end 118, and an upper end 120. The rear end 114 is opposite to the front end 116. The lower end 118 connects the rear end 114 to the front end 116 and is opposite to the upper end 120. In some implementations, the frame 102 may include a recoil mechanism (not shown) to adjust tension in the track 104. The track 104, which may be formed of a plurality of shoes 122, is a ground-engaging device that encircles the frame 102 and propels the machine.

The sprocket 106, which is rotatably mounted to the rear end 114 of the frame 102, is configured to drive the track 104 around the frame 102. The idler 108 is mounted to the front end 116 of the frame 102 and is configured to guide the track 104 therearound. The plurality of rollers 110 are rotatably mounted to the lower end 118 of the frame 102 to guide the track 104 between the sprocket 106 and the idler 108. The arrangement of slider assemblies 112, which will be described in detail below, includes a pair of end slider assemblies 124 and a plurality of central slider assemblies 126 mounted to the upper end 120 of the frame 102 to support and guide the track 104 between the sprocket 106 and the idler 108. An end slider assembly 124 of the pair of end slider assemblies 124 is mounted to the upper end 120 of the frame 102 at a location that is adjacent to the idler 108. Another end slider assembly 124 of the pair of end slider assemblies 124 is mounted to the upper end 120 of the frame 102 at a location that is adjacent to the sprocket 106. The end slider assembly 124 is substantially identical to the other end slider assembly 124. The plurality of central slider assemblies 126 are spacedly mounted to the upper end 120 of the frame 102 between the end slider assembly 124 and the other end slider assembly 124. For example, a space between the end slider assembly 124 and an adjacent central slider assembly 126 of the plurality of central slider assemblies 126 has a length in a range of approximately 350 millimeters (mm) to approximately 500 mm. The same spacing may occur between remaining slider assemblies of the arrangement of slider assemblies 112. As structured and configured, the arrangement of slider assemblies 112 forms a mirrored arrangement.

As indicated above, FIG. 1 is provided as an example. Other examples may differ from what is described with regard to FIG. 1. For example, the number and arrangement of components may differ from those shown in FIG. 1. Thus, there may be additional components, fewer components, different components, differently shaped components, differently sized components, and/or differently arranged components than those shown in FIG. 1. For example, the plurality of rollers 110 may include a different quantity of rollers 110 (e.g., eight, ten, and/or the like). As a further example, the arrangement of slider assemblies 112 may include a different quantity of central slider assemblies 126 (e.g., two, four, and/or the like).

Figure 2:
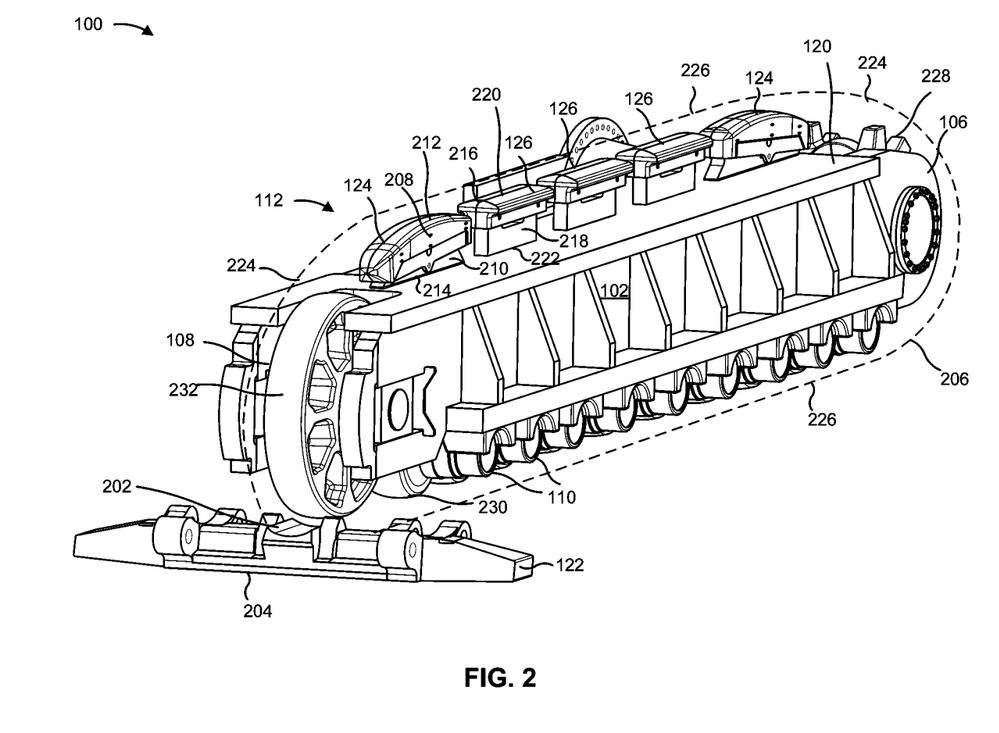
FIG. 2 is an isometric view of the undercarriage in alignment with a single shoe of the track.

FIG. 2 depicts the undercarriage 100 in alignment with a shoe 122 of the plurality of shoes 122. The shoe 122, which has substantially the same structure as remaining shoes 122 of the plurality of shoes 122, includes an inner contact surface 202 and an outer contact surface 204 that is opposite to the inner contact surface 202. As will be described below, the inner contact surface 202 is configured to slidably contact the idler 108, the plurality of rollers 110, the sprocket 106, and the arrangement of slider assemblies 112 as the shoe 122 travels along an oblong path 206 around the frame 102. The outer contact surface 204 is configured to slidably engage a ground surface in the meantime.

To simplify explanation of the arrangement of slider assemblies 112, the structure of the end slider assembly 124 and a single central slider assembly 126 (hereinafter referred to as the central slider assembly 126) will be described below. It should be understood that the described structure is respectively applicable to the other end slider assembly 124 and remaining central slider assemblies 126 of the arrangement of central slider assemblies 126.

The end slider assembly 124 includes an end slider 208 and an end support member 210. The end slider 208 includes an upper surface 212 that is configured to slidably contact and support the inner contact surface 202 of the shoe 122. To support the shoe 122, the end slider 208 of the end slider assembly 124 may have a height that is greater than a height of the end support member 210, a width that is greater than a width of the end support member 210, and a length that is greater than a length of the end support member 210. For example, with respect to the end slider 208 of the end slider assembly 124, the height may be in a range of approximately 400 mm to approximately 500 mm, the width may be in a range of approximately 200 mm to approximately 300 mm, and the length may be in a range of approximately 1700 mm to approximately 1800 mm. A ratio of the height of the end slider 208 of the end slider assembly 124 to an overall height of the end slider assembly 124 may be in a range of approximately 0.75 to approximately 0.95. Other dimensions and/or ratios are contemplated.

The end support member 210 of the end slider assembly 124 is configured to support the end slider 208. The end support member 210 includes a lower surface 214 that is opposite to the upper surface 212 and configured to contact the upper end 120 of the frame 102 when the end support member 210 is mounted to the frame 102. In some implementations, to ensure that the end slider assembly 124 is fixedly attached to the frame 102, the end support member 210 may be secured to the frame 102 via one or more fasteners (e.g., bolts, screws, latches, clips, clasps, welding, and/or other types of fasteners).

The central slider assembly 126 includes a central slider 216 and a central support member 218. The central slider 216 includes an upper surface 220 that is configured to slidably contact and support the inner contact surface 202 of the shoe 122. To support the shoe 122, the central slider 216 of the central slider assembly 126 may have a width that is greater than a width of the central support member 218 and a length that is greater than a length of the central support member 218. For example, with respect to the central slider 216 of the central slider assembly 126, the width may be in a range of approximately 200 mm to approximately 300 mm and the length may be in a range of approximately 1100 to approximately 1200 mm. A height of the central slider 216 of the central slider assembly 126 may be in a range of approximately 200 mm to approximately 300 mm. A ratio of the height of the central slider 216 of the central slider assembly 126 to an overall height of the central slider assembly 126 may be in a range of approximately 0.35 to approximately 0.55. Other dimensions and/or ratios are contemplated.

The central support member 218 of the central slider assembly 126 is configured to support the central slider 216. The central support member 218 includes a lower surface 222 that is opposite to the upper surface 220 and configured to contact the upper end 120 of the frame 102 when the central support member 218 is mounted to the frame 102. In some implementations, to ensure that the central slider assembly 126 is fixedly attached to the frame 102, the central support member 218 may be secured to the frame 102 via one or more fasteners (e.g., bolts, screws, latches, clips, clasps, welding, and/or another type of fastener).

To guide the shoe 122 along the oblong path 206, the upper surface 212 of the end slider assembly 124 and the upper surface 220 of the central slider assembly 126 are sized and shaped in a complementary manner to the inner contact surface 202 of the shoe 122. Thus, widths of the upper surfaces 212, 220, which are respectively the same as the widths of the end slider 208 and the central slider 216, are substantially equal to a width of the inner contact surface 202. Furthermore, the upper surfaces 212, 220 may be convex in a lateral direction that is perpendicular to the oblong path 206, and the inner contact surface 202 may be correspondingly concave in the lateral direction.

Because the end slider 208 is positioned at a junction between a curved section 224 and a linear section 226 of the oblong path 206, the end slider 208 experiences impact from the shoe 122 along multiple directions. The central slider 216, in contrast, is positioned along the linear section 226 of the oblong path 206, and thus experiences less impact from the shoe 122. In order to have a service life that is substantially equal to a service life of the central slider 216 (e.g., in a range of approximately 2,000 hours to approximately 5,000 hours), the end slider 208 may be heavier and more robust than the central slider 216. For example, a weight of the end slider 208 may be in a range of approximately 1000 kilograms (kg) to approximately 1100 kilograms. A weight of the central slider 216 may be in a range of approximately 400 kg to approximately 500 kg. In order to withstand forces in a variety of environmental conditions, the end slider 208 and the central slider 216 may be made of manganese steel or another type of metal having a high impact strength and/or resistance to abrasion. Other weights and/or materials are contemplated.

To smoothly transition the oblong path 206 between the curved section 224 and the linear section 226 (e.g., as the shoe moves around the idler 108 or the sprocket 106), the upper surface 212 of the end slider 208 has an asymmetric shape along the length of the end slider 208. In particular, the upper surface 212 has, along the length of the end slider 208, a first radius of curvature that is proximate to the curved section 224 of the oblong path 206 and a second radius of curvature that is proximate to the linear section 226 of the oblong path 206. The second radius of curvature is greater than the first radius of curvature. Due to the central slider 216 being positioned along the linear section 226 of the oblong path 206, the upper surface 220 of the central slider 216 is substantially linear.

In use, teeth 228 of the sprocket 106 may engage the shoe 122 to push the shoe 122 in either direction along the oblong path 206. For example, in a clockwise direction along the oblong path 206, the sprocket 106 pushes the shoe 122 toward the plurality of rollers 110. Outer surfaces 230 of the plurality of rollers 110, which have substantially the same widths and convex curvatures as those of the upper surfaces 212, 220 of the end slider 208 and the central slider 216, contact the inner contact surface 202 of the shoe 122 to guide the shoe 122 along the ground surface. When the shoe 122 reaches the idler 108, an outer surface 232 of the idler 108, which likewise has substantially the same width and convex curvature as that of the upper surfaces 212, 220 of the end slider 208 and the central slider 216, contacts the inner contact surface 202 of the shoe 122 to guide the shoe 122 around the curved section 224 of the oblong path 206. Due to the increasing radius of curvature of the upper surface 212 of the end slider 208, the shoe 122 smoothly slides along the upper surface 212 of the end slider 208. The shoe 122 then slides along the upper surfaces 220 of the plurality of central sliders 216 and along the decreasing radius of curvature of the other end slider 208 before returning to the sprocket 106. It should be understood that these steps occur in reverse order when the sprocket 106 drives the shoe 122 in the counterclockwise direction.

As indicated above, FIG. 2 is provided as an example. Other examples may differ from what is described with regard to FIG. 2. For example, the number and arrangement of components may differ from those shown in FIG. 2. Thus, there may be additional components, fewer components, different components, differently shaped components, differently sized components, and/or differently arranged components than those shown in FIG. 2.

As will be described below in connection with FIGS. 3-9, in some implementations, at least one slider of the pair of end slider assemblies 124 and/or the plurality of central slider assemblies 126 may be formed of multiple, removably attached components to facilitate installation and/or removal of the at least one slider.

Figure 3:
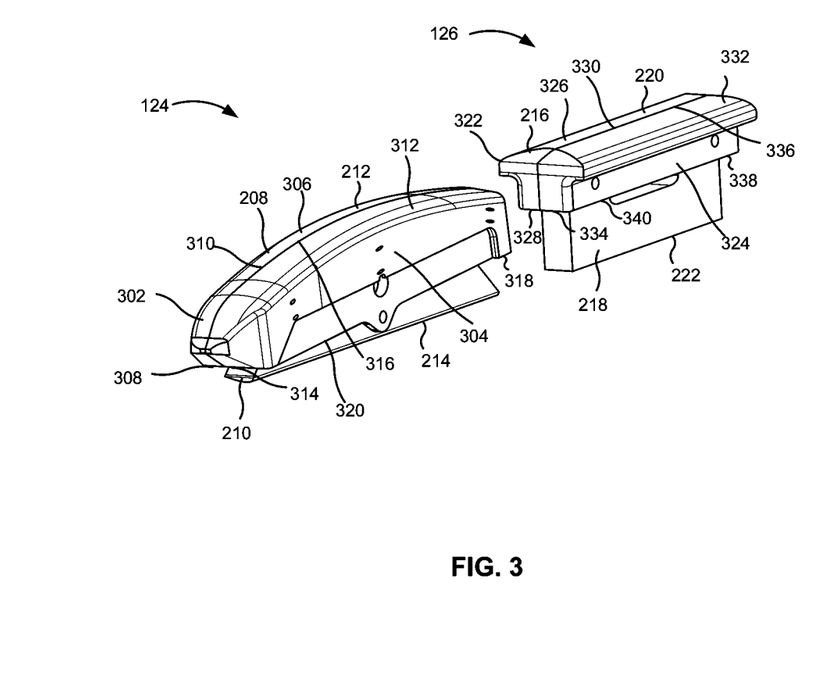
FIG. 3 is an isometric view of an end slider assembly and a central slider assembly of the undercarriage.

FIG. 3 depicts the end slider assembly 124 and the central slider assembly 126. As indicated above, it should be understood that the following description equally applies to remaining slider assemblies of the arrangement of slider assemblies 112. The end slider 208 of the end slider assembly 124 has a first segment 302 and a second segment 304. The first segment 302 includes a first upper surface 306, a first lower surface 308, and a first interior surface 310 that connects the first upper surface 306 to the first lower surface 308. The first interior surface 310 of the end slider assembly 124 may be substantially planar. The second segment 304, which may be substantially identical to the first segment 302, includes a second upper surface 312, a second lower surface 314, and a second interior surface 316 that connects the second upper surface 312 to the second lower surface 314. The second interior surface, which may be substantially planar, is configured to be removably attached to the first interior surface 310. The first upper surface 306 and the second upper surface 312 together define the upper surface 212 of the end slider 208. The first lower surface 308 and the second lower surface 314 together define a lower surface 318 of the end slider 208 that is spaced a distance from the lower surface 214 of the end support member 210 when the end slider 208 is attached to the end support member 210. In order to attach the end slider 208 to the end support member 210, the lower surface 318 of the end slider 208 may include an opening 320 that is configured to receive a portion of the end support member 210. Once the end slider 208 and the end support member 210 are so engaged, the end slider 208 may be removably secured to the end support member 210 via one or more fasteners (e.g., bolts, screws, latches, clips, clasps, and/or another type of fastener).

The central slider 216 of the central slider assembly 126 likewise has a first segment 322 and a second segment 324. The first segment 322 includes a first upper surface 326, a first lower surface 328, and a first interior surface 330 that connects the first upper surface 326 to the first lower surface 328. The first interior surface 330 may be substantially planar. The second segment 324, which may be substantially identical to the first segment 322, includes a second upper surface 332, a second lower surface 334, and a second interior surface 336 that connects the second upper surface 332 to the second lower surface 334. The second interior surface 336, which may be substantially planar, is configured to be removably attached to the first interior surface 330. The first upper surface 326 and the second upper surface 332 together define the upper surface 220 of the central slider 216. The first lower surface 328 and the second lower surface 334 together define a lower surface 338 of the central slider 216 that is spaced a distance from the lower surface 222 of the central support member 218 when the central slider 216 is attached to the central support member 218. In order to attach the central slider 216 to the central support member 218, the lower surface 338 of the central slider 216 may include an opening 340 that is configured to receive a portion of the central support member 218. Once the central slider 216 and the central support member 218 are so engaged, the central slider 216 may be removably secured to the central support member 218 via one or more fasteners (e.g., bolts, screws, latches, clips, clasps, and/or another type of fastener).

As indicated above, FIG. 3 is provided as an example. Other examples may differ from what is described with regard to FIG. 3. For example, the number and arrangement of components may differ from that shown in FIG. 3. Thus, there may be additional components, fewer components, different components, differently shaped components, differently sized components, and/or differently arranged components than those shown in FIG. 3. For example, at least one of the end slider assembly 124 and the central slider assembly 126 may include a slider having more than two segments (e.g., four segments, six segments, and/or the like). As a further example, the interior surfaces may be non-planar and instead have complementarily-shaped serrations, curvatures, or other shapes.

Figure 4:
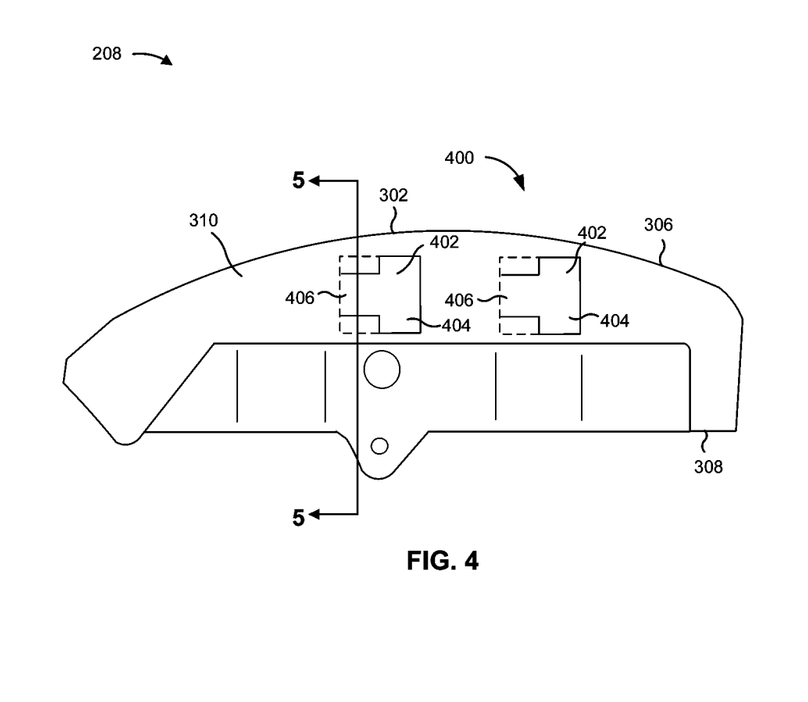
FIG. 4 is a side view of a first segment of an end slider of the end slider assembly.
Figure 5:
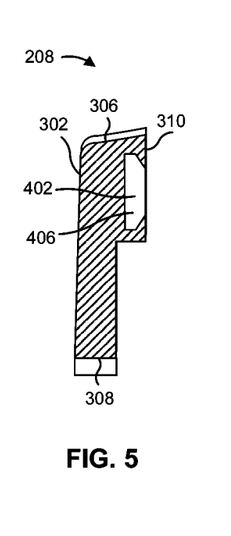
FIG. 5 is a cross-sectional view of the first segment of the end slider, taken along line 5-5 of FIG. 4.
Figure 6:
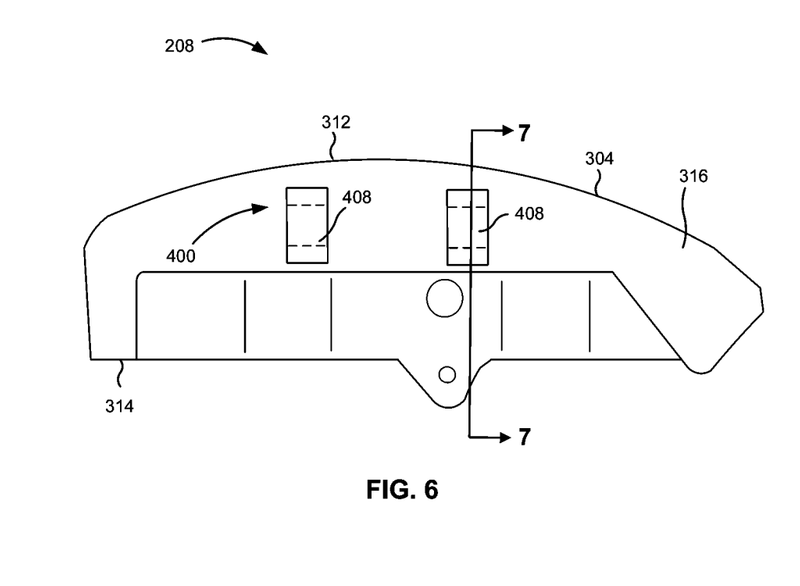
FIG. 6 is a side view of a second segment of the end slider.
Figure 7:
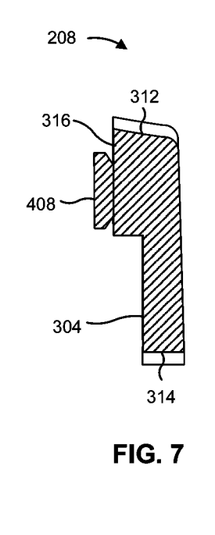
FIG. 7 is a cross-sectional view of the second segment of the end slider, taken along line 7-7 of FIG. 6.

FIGS. 4-9 depict an exemplary dovetail attachment mechanism 400 of the end slider 208. It should be understood that the central slider 216 may also utilize the dovetail attachment mechanism 400 as described below. As shown in FIGS. 4-5, the first interior surface 310 of the first segment 302 of the end slider 208 includes a pair of dovetail recesses 402, which together form a component of the dovetail attachment mechanism 400. Each recess 402 of the pair of dovetail recesses 402 includes an insertion portion 404, which has a substantially rectangular cross-sectional shape, and a securement portion 406, which has a substantially trapezoidal shape. As shown in FIGS. 6-7, the second interior surface 316 of the second segment 304 of the end slider 208 includes a pair of dovetail projections 408, which together form a complementary component of the dovetail attachment mechanism 400. Each projection 408 of the pair of dovetail projections 408 has a substantially trapezoidal cross-sectional shape that is substantially the same as the substantially trapezoidal shape of the insertion portions 404 of the pair dovetail recesses 402.

Figure 8:
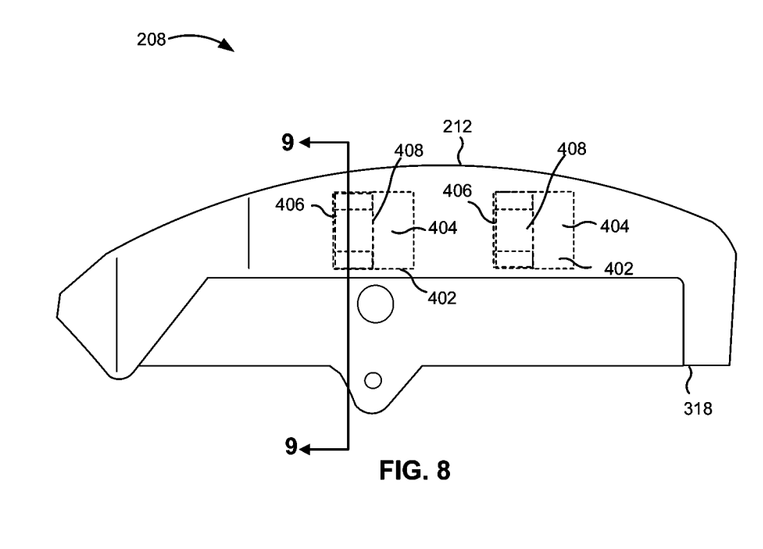
FIG. 8 is a side view of the end slider in an attached state.
Figure 9:
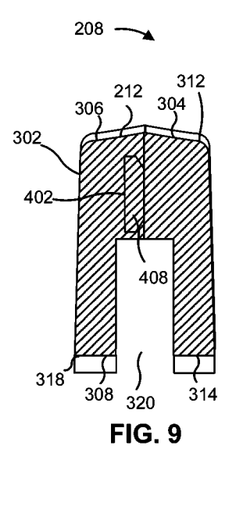
FIG. 9 is a cross-sectional view of the end slider in the attached state, taken along line 9-9 of FIG. 8.

Thus, in use, the pair of dovetail projections 408 may be respectively inserted into the insertion portions 404 of the pair of dovetail recesses 402. Once the pair of dovetail recesses 402 receive the pair of dovetail projections 408, the first segment 302 and the second segment 304 of the end slider 208 may be slid relative to one another to cause the pair of dovetail projections 408 to slide into the securement portions 406 of the pair of dovetail recesses 402. Once the dovetail attachment mechanism 400 is so engaged, the first segment 302 and the second segment 304 form the attached state, as shown in FIGS. 8-9.

As indicated above, FIGS. 4-9 are provided as an example. Other examples may differ from what is described with regard to FIGS. 4-9. For example, the number and arrangement of components may differ from those shown in FIGS. 4-9. Thus, there may be additional components, fewer components, different components, differently shaped components, differently sized components, and/or differently arranged components than those shown in FIGS. 4-9. As an example, the dovetail attachment mechanism 400 may include a different number of dovetail projections and dovetail recesses (e.g., one, three, four, and/or the like). As another example, the first segment 302 (and correspondingly, the second segment 304) may include a combination of at least one dovetail projection and at least one dovetail recess. As a further example, the end slider 208 and/or the central slider 216 may utilize a different type of attachment mechanism, such as one or more magnets, a snap-type fastener (e.g., a trim molding fastener), a clip, or another type of fastener. Additionally or alternatively, the end slider 208 and/or the central slider 216 may include a locking mechanism (e.g., a quarter-turn latch or another type of locking mechanism) to prevent relative movement between the first segment 302 and the second segment 304 until the locking mechanism is disengaged.

INDUSTRIAL APPLICABILITY

The end slider 208 and the central slider 216 of the present disclosure are particularly applicable in a machine having a track-type undercarriage, such as the undercarriage 100. The machine may be a rope shovel, a hydraulic mining shovel, an excavator, a forest machine, or another type of machine.

Because the end slider 208 and the central slider 216 of the present disclosure have been designed cohesively as part of the arrangement of slider assemblies 112, the end slider 208 and the central slider 216 have substantially equal service lives, which streamlines replacement and minimizes machine downtime. Additionally, because of the robust design and variable curvature of the end slider 208, the end slider 208 has improved wear resistance relative to other types of end sliders. Because the arrangement of slider assemblies 112 includes only two types of sliders (the end slider 208 and the central slider 216), the arrangement of slider assemblies 112 also has the benefit of reducing inventory costs and simplifying installation and/or replacement of the sliders. In implementations in which the end slider 208 and/or the central slider 216 are made to be separable (e.g., by including the dovetail attachment mechanism 400 or another type of attachment mechanism), the end slider 208 and the central slider 216 further facilitate installation and/or replacement, particularly in heavy duty applications where the weights of the components may pose challenges.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, as used herein, the terms "comprises," "comprising," "having," "including," or other variations thereof, are intended to cover non-exclusion, such that a process, method, article, or apparatus that comprises a list of elements does not include only those elements, but may include other elements not expressly listed. In addition, in this disclosure, relative terms, such as, for example, "about," "generally," "substantially," and "approximately" are used to indicate a possible variation of ±10% of the stated value, except where otherwise apparent to one of ordinary skill in the art from the context. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A split slider, comprising:
   a first segment having a first upper surface, a first lower surface, and a first interior surface that connects the first upper surface to the first lower surface, wherein
      the first upper surface is configured to support a track, and
      the first interior surface includes a first component of an attachment mechanism; and
   a second segment having a second upper surface, a second lower surface, and a second interior surface that connects the second upper surface to the second lower surface, wherein
      the second upper surface is configured to support the track,
      the second interior surface includes a second component of the attachment mechanism that is configured to be removably attached to the first component of the attachment mechanism to cause the second segment to be removably attached to the first segment via the attachment mechanism,
      the second lower surface and the first lower surface together define a lower surface of the split slider that includes an opening,
         wherein the opening is configured to receive a support member to attach the split slider to an undercarriage frame.

2. The split slider of claim 1, wherein the first interior surface and the second interior surface are substantially planar.

3. The split slider of claim 1, wherein, when the second component of the attachment mechanism is removably attached to the first component of the attachment mechanism, the second interior surface of the second segment abuts the first interior surface of the first segment.

4. The split slider of claim 1, wherein the attachment mechanism is a dovetail attachment mechanism, the first component is a dovetail recess, and the second component is a dovetail projection.

5. The split slider of claim 1, wherein, in a longitudinal direction of the split slider,
   the first upper surface has a first radius of curvature and a second radius of curvature that is greater than the first radius of curvature; and
   the second upper surface has a shape that is substantially the same as a shape of the first upper surface.

6. The split slider of claim 1, wherein, in a longitudinal direction of the split slider, the first upper surface and the second upper surface are substantially linear.

7. The split slider of claim 1, wherein
   a length of the first upper surface is in a range of approximately 1100 millimeters to approximately 1200 millimeters; and
   a length of the second upper surface is substantially equal to the length of the first upper surface.

8. An end slider assembly, comprising:
   an end support member that is configured to be attached to an undercarriage frame at a location that is adjacent to a sprocket or an idler; and
   an end slider that is configured to support a track, wherein the end slider includes:
      a height that is greater than a height of the end support member,
      a width that is greater than a width of the end support member, and
      a length that is greater than a length of the end support member,
      the end slider, along the length thereof, has a first radius of curvature and a second radius of curvature that is greater than the first radius of curvature, and
      the end slider includes:
         a first segment, and
         a second segment that is configured to be removably attached to the first segment via an attachment mechanism.

9. The end slider assembly of claim 8, wherein the end slider, along the length thereof, is asymmetrical.

10. The end slider assembly of claim 8, wherein the attachment mechanism is a dovetail attachment mechanism.

11. The end slider assembly of claim 8, wherein
   the width of the end slider is in a range of approximately 200 millimeters to approximately 300 millimeters; and
   the length of the end slider is in a range of approximately 1700 millimeters to approximately 1800 millimeters.

12. The end slider assembly of claim 8, wherein a weight of the end slider is in a range of approximately 1000 kilograms to approximately 1100 kilograms.

13. The end slider assembly of claim 8, wherein the end slider is made of manganese steel.

14. A slider arrangement, comprising:
   at least one end slider having a first end segment and a second end segment that is removably attached to the first end segment,
      wherein the first end segment and the second end segment together form an upper surface of the at least one end slider that is configured to support a track,
      wherein, along a longitudinal direction of the slider arrangement, the upper surface of the at least one end slider includes a first radius of curvature and a second radius of curvature that is greater than the first radius of curvature; and
   at least one central slider having a first central segment and a second central segment that is removably attached to the first central segment, wherein
      the first central segment and the second central segment together form an upper surface of the at least one central slider that is configured to support the track, wherein the upper surface of the at least one central slider is substantially linear along the longitudinal direction of the slider arrangement.

15. The slider arrangement of claim 14, wherein
the at least one end slider is two end sliders; and
the at least one central slider is three central sliders.

16. The slider arrangement of claim 14, wherein the at least one end slider has a weight that is greater than a weight of the at least one central slider.

17. The slider arrangement of claim 14, wherein the at least one end slider has a length that is greater than a length of the at least one central slider.

18. The slider arrangement of claim 14, wherein
the first end segment is removably attached to the second end segment via a first dovetail attachment mechanism; and
the first central segment is removably attached to the second central segment via a second dovetail attachment mechanism.

19. The slider arrangement of claim 14, wherein a space between an end slider of the at least one end slider and an adjacent central slider of the at least one central slider has a length in a range of approximately 350 millimeters to approximately 500 millimeters.

20. The split slider of claim 1, wherein the first component is a recess, and the second component is a projection.

* * * * *